United States Patent
Leamy et al.

(12) 
(10) Patent No.: US 6,470,258 B1
(45) Date of Patent: Oct. 22, 2002

(54) SYSTEM AND METHOD FOR MONITORING ENGINE STARTING SYSTEMS

(75) Inventors: Kevin Richard Leamy, Loveland, OH (US); Mark Gerard Butz, Loveland, OH (US); Robert William Lambert, West Chester, OH (US)

(73) Assignee: General Electric Company, Schenectady, NY (US)

( * ) Notice: Subject to any disclaimer, the term of this patent is extended or adjusted under 35 U.S.C. 154(b) by 8 days.

(21) Appl. No.: 09/861,336

(22) Filed: May 18, 2001

(51) Int. Cl.[7] .............................................. G06F 17/00
(52) U.S. Cl. ........................................ 701/100; 701/29
(58) Field of Search ............................ 701/29, 35, 100, 701/3; 60/39.141, 39.142; 73/116, 118.1

(56) References Cited

U.S. PATENT DOCUMENTS

| | | | | |
|---|---|---|---|---|
| 4,215,412 A | * | 7/1980 | Bernier et al. ............... | 701/100 |
| 4,891,971 A | * | 1/1990 | Jones et al. .................. | 340/959 |
| 5,107,674 A | * | 4/1992 | Wibbelsman et al. ......... | 60/778 |
| 5,583,420 A | * | 12/1996 | Rice et al. .................... | 322/25 |
| 5,680,310 A | * | 10/1997 | Morgan et al. ............. | 701/100 |
| 5,845,483 A | * | 12/1998 | Petrowicz ................ | 60/39.163 |

* cited by examiner

*Primary Examiner*—Michael J. Zanelli
(74) *Attorney, Agent, or Firm*—William Scott Andes; Pierce Atwood

(57) ABSTRACT

A method and system for monitoring engine starting system performance in a gas turbine engine using a plurality of sensors to sense data related to the operation and performance of the gas turbine engine. Selected data parameters from the sensed data are continuously sampled during an engine start sequence. The data parameters are then evaluated to determine whether predetermined sets of criteria have been met. Selected engine starting system performance data and data sampling times are captured when each of the sets of criteria are met. The captured engine starting system performance data are normalized and then compared to a parametric baseline for the gas turbine engine.

27 Claims, 2 Drawing Sheets

SYSTEM AND METHOD FOR MONITORING ENGINE STARTING SYSTEMS

BACKGROUND OF THE INVENTION

This invention relates generally to gas turbine engines and more particularly to monitoring engine starting system performance in such engines.

Gas turbine engines are used for a wide variety of aeronautical, marine and industrial applications. Generally, a gas turbine engine includes a compressor that provides pressurized air to a combustor, wherein the air is mixed with fuel and the mixture is ignited for generating hot combustion gases. These gases flow downstream to a turbine section that extracts energy therefrom to drive the compressor and provide useful work. In many applications, gas turbine engines are routinely subject to various maintenance procedures as part of their normal operation. To aid in the provision of such maintenance services, monitoring systems are often employed to provide diagnostic monitoring of the gas turbine engine. These systems commonly include performance monitoring equipment that collects relevant trend and fault data used for diagnostic trending. In diagnostic trend analysis, certain process data (such as exhaust gas temperature, fuel flow, rotor speed and the like) that are indicative of overall engine performance and/or condition are compared to a parametric baseline for the gas turbine engine. Any divergence of the raw trend data from the parametric baseline may be indicative of a present or future condition that requires maintenance.

For example, modern aircraft currently operated by commercial airlines typically employ an onboard data acquisition system for collecting digital flight data to use in diagnostic monitoring. In such systems, a number of sensors distributed throughout the aircraft and engines provide data signals representative of the performance of the aircraft and its engines. Such data can be recorded onboard and accessed later by ground maintenance personnel or, alternatively, can be remotely transmitted to ground locations during flight operations for real-time processing. Engine condition monitoring techniques typically use a screening process to identify various phases of operation and then extract specific data during the flight phases of interest. Currently, data collection is conducted during flight phases such as take off, climb and steady cruise, because these are the phases during which engine anomalies are most likely to be detected. While these approaches work quite well in detecting anomalies in the primary engine components, they are not as effective in monitoring the condition of the engine starting system components. Being able to predict maintenance needs in engine starting systems will greatly enhance reliability and dispatchability.

Accordingly, it is desirable to be able to effectively monitor potential poor performing engine starting system components in gas turbine engines.

BRIEF SUMMARY OF THE INVENTION

The above-mentioned need is met by the present invention, which provides a method and system for monitoring engine starting system performance in a gas turbine engine in which a plurality of sensors used to sense data related to the operation and performance of the gas turbine engine. Selected data parameters from the sensed data are continuously sampled during an engine start sequence. The data parameters are then evaluated to determine whether predetermined sets of criteria have been met, and selected engine starting system performance data and data sampling times are captured when each of the sets of criteria are met. The captured engine starting system performance data are normalized and then compared to a parametric baseline for the gas turbine engine.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
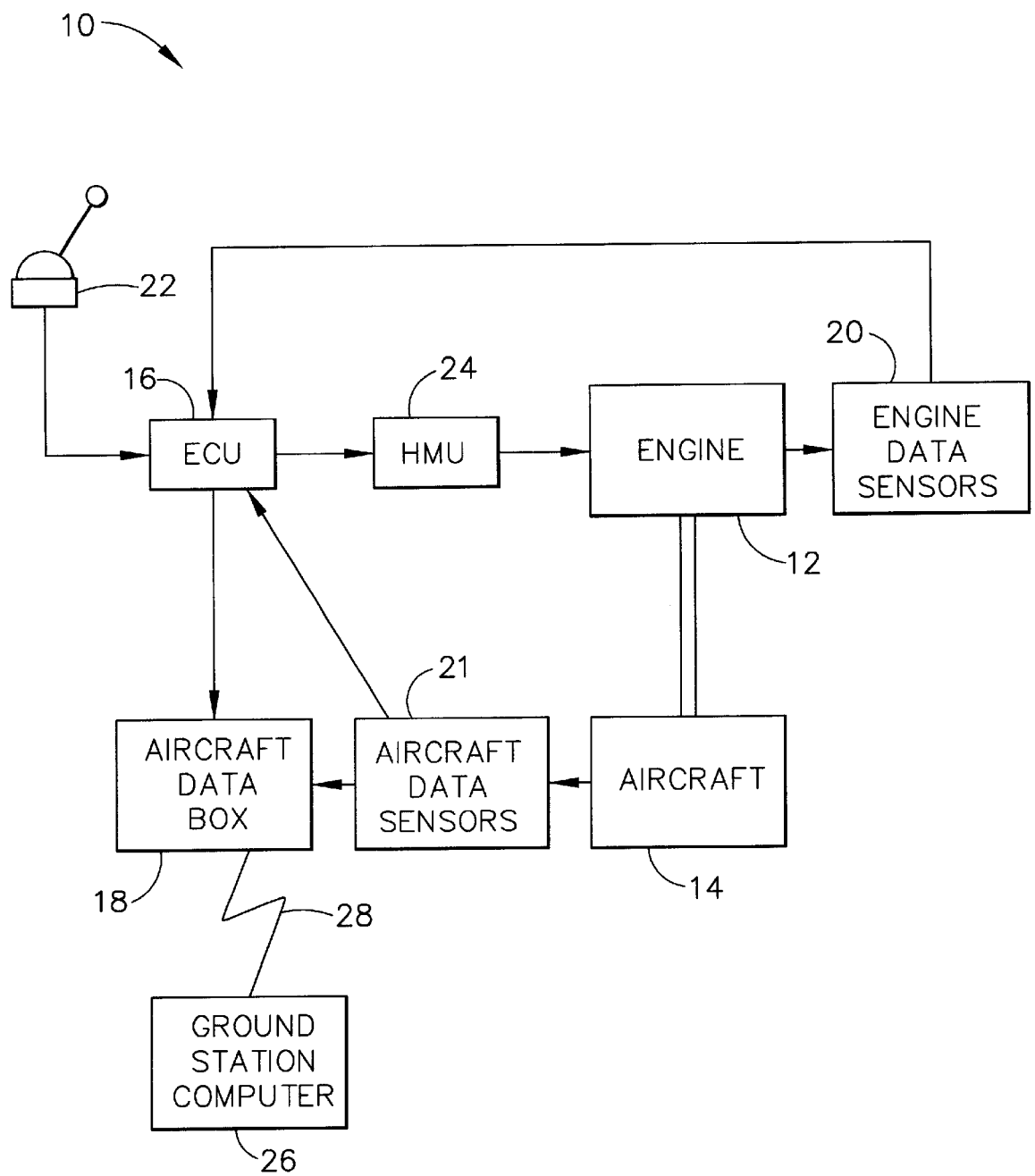
FIG. 1 is a schematic diagram of a system for monitoring the condition of the engine starting system in a gas turbine engine.

Referring to the drawings wherein identical reference numerals denote the same elements throughout the various views, FIG. 1 shows a block diagram of system 10 for monitoring the condition of the engine starting system in a gas turbine engine 12 mounted on an aircraft 14. Although only one engine 12 is shown in FIG. 1, it should be noted that the aircraft 14 could have additional engines mounted thereon. As will be apparent from the following description, data collection for such additional engines would be accomplished in a manner identical to that for engine 12. Therefore, only the engine 12 and its associated equipment will be described herein. Furthermore, it should be noted that the engine 12 is described in connection with an aircraft only by way of example. In addition to aeronautical applications, the present invention is applicable to other applications of gas turbine engines, including marine and industrial applications.

The system 10 includes an electronic control unit (ECU) 16, such as a full authority digital engine control (FADEC) although other controllers can be used and an onboard aircraft data box 18. A set of conventional engine data sensors 20 and aircraft data sensors 21 is distributed throughout the engine 12 and aircraft 14 to sense selected data parameters related to the operation and performance of the engine 12 and/or the aircraft 14. The engine data sensors 20 and aircraft data sensors 21 can comprise any group of sensors that monitor data parameters of interest. In addition to aircraft parameters such as air speed and altitude, engine parameters would typically include exhaust gas temperature, engine fuel flow, core speed, compressor discharge pressure, turbine exhaust pressure, fan speed, and the like.

The ECU 16 receives signals from the engine data sensors 20 and aircraft data sensors 21 as is known in the art. The ECU 16 also receives a thrust request signal from a throttle 22 controlled by the aircraft's pilot. In response to these inputs, the ECU 16 generates command signals to operate engine actuators, such as a hydromechanical unit (HMU) 24 that meters the flow of fuel to the engine 12. The HMU 24 is a unit that is well known to those skilled in the art. The ECU 16 also outputs data signals to the aircraft data box 18.

The aircraft data box 18, which can be any conventional device such as a flight data recorder, quick access recorder, or any other type of in-flight data storage device, has a relatively large data storage capacity for storing the data signals. The aircraft data box 18 also receives signals from the aircraft data sensors 21.

As is known in the art, the engine 12 includes an engine starting system having an engine turbine starter that is mounted on the engine's gearbox. During an engine start sequence, high pressure auxiliary air is delivered to the starter, which causes the engine core to rotate via the gearbox. The ECU 16 schedules fuel delivery and variable geometry adjustments to complete the engine start sequence and bring the engine 12 to idle operating condition. Typically, the source of auxiliary air is an auxiliary power unit (APU) which is usually located in the tail of an aircraft 14, a ground cart, or cross bleed from another engine.

The system 10 includes an algorithm that processes the data signals to monitor engine starting system performance characteristics. The monitoring algorithm can be implemented in a number of ways. For example, the monitoring algorithm could be implemented on the ECU 16 wherein the data signals are processed as they are received by the ECU 16. Alternatively, the monitoring algorithm could be implemented on the aircraft data box 18. In this case, the data signals would be processed after being transferred to the aircraft data box 18. Another alternative is to implement the monitoring algorithm on a ground station computer 26, such as personal or workstation computer. The data signals stored in the aircraft data box 18 during a flight are downloaded to the ground station computer for processing. This transfer can be accomplished after the flight via any sort of link 28 including use of a removable computer-readable medium, such as a floppy disk, CD-ROM or other optical medium, magnetic tape or the like, or a wireless communication link. It is also possible to remotely transmit the data signals directly to the ground station computer 26 during flight operations for real-time processing. With any implementation, the monitoring algorithm can be stored on the unit (be it the ECU, aircraft data box or ground station computer) and accessed from there, or alternatively, it could be accessed from a removable computer-readable medium inserted into the appropriate drive of the unit. The monitoring algorithm could also be accessed via the Internet or another computer network. As used herein, the term "computer-readable medium" refers generally to any medium from which stored data can be read by a computer or similar unit. This includes not only removable media such as the aforementioned floppy disk and CD-ROM, but also non-removable media such as a hard disk or integrated circuit memory device in the ECU 16, aircraft data box 18 or ground station computer 26.

Figure 2:
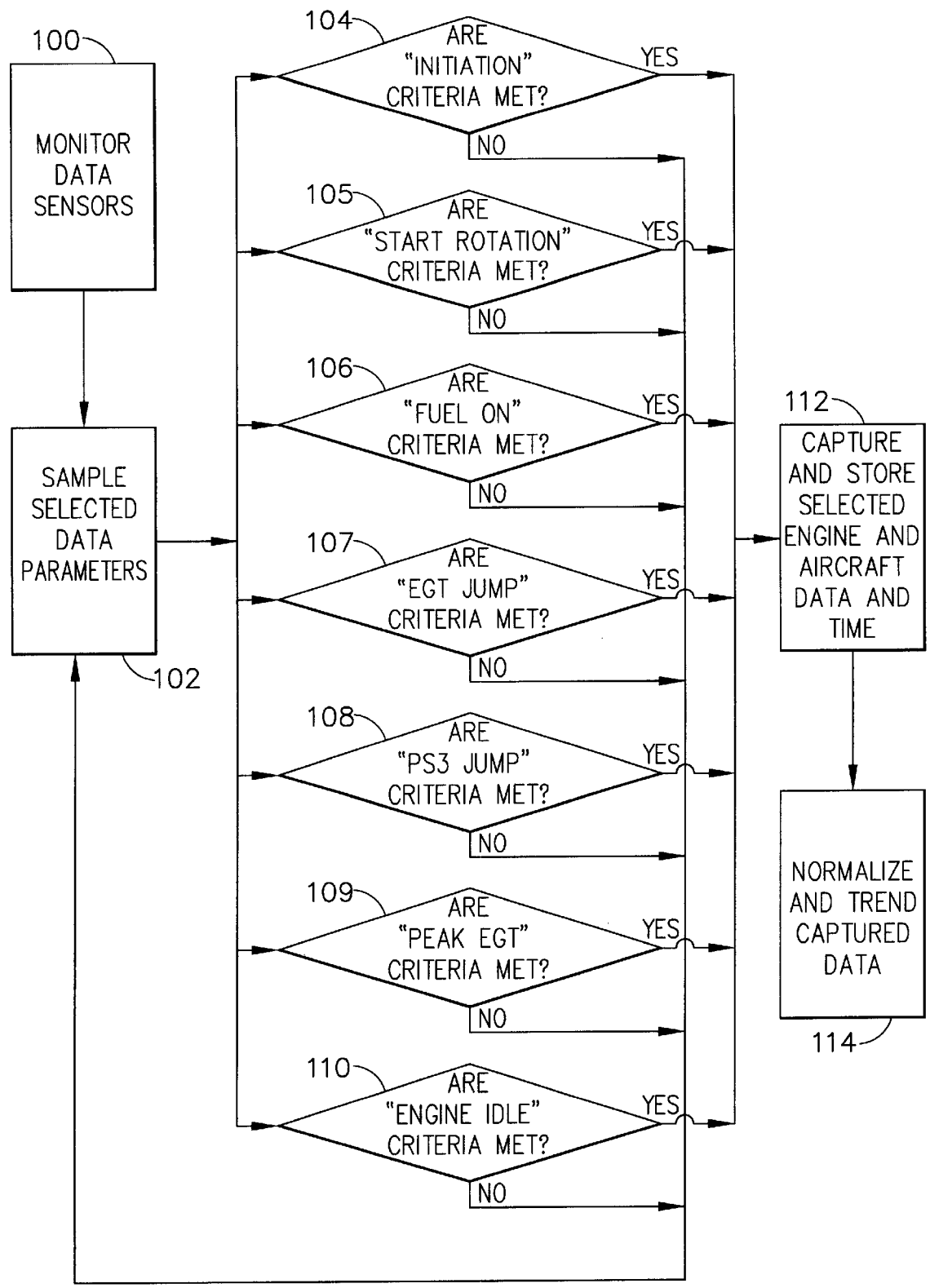
FIG. 2 is a flow chart illustrating an algorithm for monitoring engine starting system performance characteristics.

Referring now to FIG. 2, the monitoring algorithm is described in more detail. The algorithm is initiated whenever an engine start sequence is begun. The first step, shown at block 100, is to continuously monitor the output of the engine data sensors 20 and aircraft data sensors 21. Next, at block 102, selected data parameters sensed by the engine data sensors 20 and aircraft data sensors 21 are continuously sampled. Typically, the data parameters are sampled at a high frequency, such as every 30–60 milliseconds, to collect a large volume of data points. Which data parameters are sampled can vary depending on a number of factors. By way of example only, the monitoring algorithm will be described herein with core speed, fuel flow, exhaust gas temperature (EGT) jump, compressor discharge pressure (PS3) jump, and peak exhaust gas temperature as the selected data parameters. However, it should be noted that the present invention is not limited to these particular data parameters and could be used with any suitable set of data parameters.

Next, each selected data parameter is evaluated to determine whether specific criteria have been met, as denoted at blocks 104–110. The purpose of this portion of the monitoring algorithm is to identify certain phases or times in the engine start sequence for monitoring engine starting system performance characteristics. In each instance, if the criteria are met at any of blocks 104–110, then the monitoring algorithm proceeds to block 112 where selected engine and aircraft data and time when the criteria are met are captured and stored. That is, as each particular set of decision criteria is met, current engine and aircraft data are captured and stored with the corresponding data sampling time. If the criteria are not met at any of blocks 104–110, then the monitoring algorithm returns to block 102 so that the data parameters are continually sampled until the criteria for each of the blocks 104–110 have been met.

Again by way of example only, the monitoring algorithm will be described herein by using seven engine start sequence phases wherein the selected data parameters are evaluated against a set of decision criteria. The data parameters are evaluated against "initiation" decision criteria at block 104, "start rotation" decision criteria at block 105, "fuel on" decision criteria at block 106, "EGT jump" decision criteria at block 107, "PS3 jump" decision criteria at block 108, "peak EGT" decision criteria at block 109, and "engine idle" decision criteria at block 110. Thus, each decision block 104–110 captures data at a different phase or time of the engine start sequence. More specifically, the initiation decision criteria of block 104 are such that data are captured when the engine start sequence is first initiated. For example, the initiation decision criteria could be: 1) the starter valve is open. If this sole criterion is met (indicating that the engine start sequence has begun), then the pertinent engine and aircraft data at that specific time are captured and stored at block 112.

The start rotation decision criteria of block 105 are such that data are captured during an early phase of the engine start sequence where the engine core has achieved a relatively low rotation speed. For example, the start rotation decision criteria could be: 1) the starter valve is open and 2) the core speed is greater than or equal to 22% of the maximum core speed. If both of these criteria are met, then the pertinent engine and aircraft data at that specific time are captured and stored at block 112.

The fuel on decision criteria of block 106 relate to when the engine fuel flow has reached a predetermined level. For example, the fuel on decision criteria could be: 1) the starter valve is open, 2) the core speed is greater than or equal to 25% of the maximum core speed, and 3) the fuel flow is greater than or equal to 250 pounds/hour. If all of these criteria are met, then the pertinent engine and aircraft data at that specific time are captured and stored at block 112. The EGT jump decision criteria of block 107 relate to whether the EGT is changing at a given rate during a certain stage of the engine start sequence. Similarly, the PS3 jump decision criteria of block 108 relate to whether the PS3 is changing at a given rate during a certain stage of the engine start sequence. For example, the EGT jump decision criteria could be: 1) the starter valve is open, 2) the core speed is less than or equal to 59% of the maximum core speed, 3) the fuel flow is greater than or equal to 250 pounds/hour, and 4) the EGT rate of change is greater than or equal to 10 ° C./second. The PS3 jump decision criteria could be: 1) the starter valve is open, 2) the core speed is less than or equal to 59% of the maximum core speed, 3) the fuel flow is greater than or equal to 250 pounds/hour, and 4) the PS3 rate of change is greater than or equal to 5 psi/second. In either case, if all of the criteria are met, then the pertinent engine and aircraft data at that specific time are captured and stored at block 112.

The peak EGT decision criteria of block 109 relate to when the EGT has peaked. This could be determined for any given sampling time, t, by comparing the EGT value with the EGT value of the two previous sampling times, t-1 and t-2. Thus, the two criteria would be 1) the EGT at sampling time t is less than the EGT at sampling time t-1 and 2) the EGT at sampling time t-1 is greater than the EGT at sampling time t-2. If both of these criteria are met, then it is assumed that the EGT peaked at sampling time t-1 and the pertinent engine and aircraft data at that specific time are captured and stored at block 112. The engine idle decision criteria of block 110 relate to when the engine has reached idle, signifying the end of the engine start sequence. For example, the engine idle decision criteria could be: 1) the core speed is greater than or equal to 59% of the maximum core speed. If this sole criterion is met, then the pertinent engine and aircraft data at that specific time are captured and stored at block 112.

The data parameters that are captured at block 112 are not necessarily the same as the data parameters sampled at block 102, although one or more of the same data parameters can be used at both steps. The reason that the data parameter sets can differ is that the data are used for different reasons. The purpose for sampling data at block 102 is to identify phases in the engine start sequence at which data are collected for trending, while at block 112, the goal is to capture the data to be used in a diagnostic trending analysis for monitoring engine starting system performance. Thus, the data parameters captured at block 112 will be related to engine starting system performance. Examples of preferred data parameters captured at block 112 include engine data such as fan speed, core speed, EGT, fuel flow and starter air pressure, and aircraft data such as altitude, ambient pressure and ambient temperature. It should be pointed out that the present invention is not limited to these data parameters, which are given only by way of example.

The data parameters captured at block 112 are not necessarily the same for each phase of the engine start sequence. Generally the data parameters collected at each phase will depend on the reason for capturing data at that particular phase. For example, the purpose for capturing data at the initiation of the engine start sequence is to establish a time baseline for the subsequent trending analysis. Thus, one possible approach is to capture all the selected engine and aircraft data parameters in response to the initiation criteria being met in block 104. Then, various subsets of these data parameters (particularly the engine-related data) can be captured in response to the specific decision criteria for blocks 105–110 being met.

The captured data for each data parameter is then normalized and trended against reference data, as indicated at block 114, to determine the engine starting system performance. The captured data is first normalized so that the data can be compared to the reference data that may have been collected at different ambient conditions (e.g., different altitudes, temperatures, auxiliary air pressures, etc.). The normalized data is compared to similar data from prior start sequences. Deviation of the current normalized data from the historical values indicates degradation in engine starting system effectiveness.

The foregoing has described a method and apparatus for monitoring engine starting system performance. While specific embodiments of the present invention have been described, it will be apparent to those skilled in the art that various modifications thereto can be made without departing from the spirit and scope of the invention as defined in the appended claims.

What is claimed is:

1. A method of monitoring engine starting system performance in a gas turbine engine, said method comprising:

sensing data related to the operation and performance of said gas turbine engine;

continuously sampling selected data parameters from said sensed data during an engine start sequence;

evaluating said data parameters to determine whether specific criteria have been met; and capturing selected engine starting system performance data when said specific criteria are met.

2. The method of claim 1 further comprising capturing data sampling times when capturing said selected engine starting system performance data.

3. The method of claim 1 wherein said data parameters include one or more of core speed, fuel flow, exhaust gas temperature and compressor discharge pressure.

4. The method of claim 1 wherein said criteria correspond to predetermined phases of an engine start sequence.

5. The method of claim 1 wherein said gas turbine engine includes a starter valve and said criteria include said starter valve being open.

6. The method of claim 1 wherein said criteria include core speed exceeding a predetermined value.

7. The method of claim 1 wherein said criteria include fuel flow exceeding a predetermined value.

8. The method of claim 1 wherein said criteria include exhaust gas temperature exceeding a predetermined rate of change.

9. The method of claim 1 wherein said criteria include compressor discharge pressure exceeding a predetermined rate of change.

10. The method of claim 1 wherein said criteria include exhaust gas temperature peaking.

11. The method of claim 1 wherein said selected engine starting system performance data include one or more of fan speed, core speed, exhaust gas temperature, fuel flow, starter air pressure, altitude, flight speed and ambient temperature.

12. The method of claim 1 further comprising normalizing said captured engine starting system performance data.

13. The method of claim 1 further comprising trending said captured engine starting system performance data by comparing it to a parametric baseline for said gas turbine engine.

14. A method of monitoring engine starting system performance in a gas turbine engine including a starter valve, said method comprising:

using a plurality of sensors to sense data related to the operation and performance of said gas turbine engine;

initiating an engine start sequence for said gas turbine engine;

continuously sampling selected data parameters from said sensed data during said engine start sequence;

evaluating said data parameters to determine whether predetermined sets of criteria have been met;

capturing selected engine starting system performance data and data sampling times when each of said sets of criteria are met;

normalizing said captured engine starting system performance data; and trending said normalized engine starting system performance data by comparing it to a parametric baseline for said gas turbine engine.

15. The method of claim 14 wherein said data parameters include one or more of core speed, fuel flow, exhaust gas temperature and compressor discharge pressure.

16. The method of claim 14 wherein one of said sets of criteria pertains to an engine start sequence being initiated.

17. The method of claim 14 wherein one of said sets of criteria includes said starter valve being open.

18. The method of claim 14 wherein one of said sets of criteria pertains to core speed exceeding a predetermined value.

19. The method of claim 14 wherein one of said sets of criteria pertains to fuel flow exceeding a predetermined value.

20. The method of claim 14 wherein one of said sets of criteria pertains to exhaust gas temperature exceeding a predetermined rate of change.

21. The method of claim 14 wherein one of said sets of criteria pertains to compressor discharge pressure exceeding a predetermined rate of change.

22. The method of claim 14 wherein one of said sets of criteria pertains to exhaust gas temperature peaking.

23. The method of claim 14 wherein one of said sets of criteria pertains to said gas turbine engine reaching idle.

24. The method of claim 14 wherein said selected engine starting system performance data include one or more of fan speed, core speed, exhaust gas temperature, fuel flow, starter air pressure, altitude, flight speed and ambient temperature.

25. A system for monitoring engine starting system performance in a gas turbine engine, said system comprising:

a plurality of sensors for sensing data related to the operation and performance of said gas turbine engine;

means for continuously sampling selected data parameters from said data sensors during an engine start sequence;

means for evaluating said data parameters to determine whether specific criteria have been met; and means for capturing selected engine starting system performance data when said specific criteria are met.

26. The system of claim 25 further comprising means for capturing data sampling times when capturing said selected engine starting system performance data.

27. A computer-readable medium containing instructions for controlling a computer-based system having a plurality of sensors for sensing predetermined parameter values related to the operation and performance of a gas turbine engine to perform a method comprising the steps of:

continuously sampling selected data parameters from said sensors during an engine start sequence;

evaluating said data parameters to determine whether specific criteria have been met; and capturing selected engine starting system performance data when said specific criteria are met.

* * * * *